United States Patent [19]

Papa et al.

[11] 3,875,183
[45] Apr. 1, 1975

[54] PROCESS FOR THE PRODUCTION OF IMIDO-ISOCYANATES
[75] Inventors: Anthony J. Papa, St. Albans, W. Va.; William R. Proops, Claymont, Del.
[73] Assignee: Union Carbide Corp., New York, N.Y.
[22] Filed: Aug. 23, 1971
[21] Appl. No.: 174,238

[52] U.S. Cl............ 260/326 N, 252/182, 260/2.5 A, 260/2.5 AT, 260/313.1, 260/326.2, 260/326.27
[51] Int. Cl...................... C07d 27/00, C07d 27/52
[58] Field of Search .. 260/453 P, 326.5 FM, 326 N, 260/313.1

[56] References Cited
UNITED STATES PATENTS
3,314,923  4/1967  Muller et al.............. 260/326 X
3,445,477  5/1969  Müller et al. .................... 260/326

*Primary Examiner*—Lewis Gotts
*Assistant Examiner*—Dolph H. Torrence
*Attorney, Agent, or Firm*—Eugene C. Trautlein

[57] ABSTRACT

This application relates to a novel process for producing imido-isocyanates by reacting an anhydride of a polycarboxylic acid and an aromatic polyisocyanate in the presence of a catalyst combination consisting of a certain phosphorus or boron compound and a dialkyl sulfoxide. In a preferred embodiment of this invention (when the anhydride is a halogenated anhydride), the imido isocyanates are novel compositions of matter which are useful as components of polyurethane-forming formulations that can be cured by conventional amine and tin catalysts to produce flame-resistant polyurethane foams.

13 Claims, No Drawings

PROCESS FOR THE PRODUCTION OF IMIDO-ISOCYANATES

Various organic isocyanates containing imido groups (imido-isocyanates) are known materials having desirable properties. By way of illustration, imido-isocyanates derived from poly(arylisocyanates) and aromatic polycarboxylic acid anhydrides can be used as components of polyurethane-forming formulations that are convertible to rigid polyurethane foams having superior thermal stability and flame resistance. However, the processes suggested to date for producing imido-isocyanates and the resulting imido-isocyanates are not entirely satisfactory.

One known process for producing imido-isocyanates involves the uncatalyzed reaction of a polyisocyanate and an anhydride of an aromatic polycarboxylic acid. The rate at which this uncatalyzed reaction proceeds is fairly slow, even at elevated temperatures.

Catalyzed processes for producing imido-isocyanates have been proposed. However, the use of at least certain of the proposed catalysts (e.g., toluene sulfonic acid) with certain reactants (e.g., chlorendic anhydride and excess tolylene diisocyanate) can result in the production of products (mixtures of imido-isocyanates and unreacted tolylene diisocyanates) that are initially, or after a fairly short period of time, non-homogeneous in that some solids are initially present or form in the liquids. From a commercial point of view, non-homogeneous products present handling and distribution problems and so such products are less desirable than homogeneous liquid products.

Moreover, at least some of the imido-isocyanates known to date, (e.g., imido isocyanates produced from trimellitic anhydride and polymethylene poly(phenyleneisocyanate), when incorporated in rigid polyurethane foam formulations, result in formulations that cure slowly to produce rigid polyurethane foams if only conventional tin and amine catalysts are used to cure the formulation. As a consequence, antimony catalysts have been recommended to accelerate the cure of such formulations.

It is an object of this invention to provide a process for producing imido-isocyanates involving relatively short reaction times.

It is another object of this invention to provide homogeneous liquid imido-isocyanate-tolylene diisocyanate solutions from chlorendic anhydride and excess tolylene diisocyanate.

It is still a further object of this invention to provide novel imido-isocyanates that are useful as components of foam formulations containing conventional amine and tin catalysts, which formulations cure rapidly to form rigid polyurethane foams, and a process for the production of such imido-isocyanates.

Other objects of this invention will be apparent from the description thereof appearing below.

This invention is based, in part, on the discovery that certain combinations of compounds are outstanding catalysts in the production of imido-isocyanates. The catalyst combinations of this invention consist of certain phosphorus or boron compounds and a dialkyl sulfoxide.

Thus, this invention provides a process for producing an aromatic isocyanate containing an imido group (i.e., an amido-isocyanate) which process comprises: (I) forming a reaction mixture containing (a) an anhydride of organic polycarboxylic acid, (b) an aromatic polyisocyanate, (c) a catalytic amount of $MB(R)_4$, $(R)_3P$, $(R)_4POOCR$, and $MP(F)_6$ wherein M is an alkali metal and R is an alkyl group or an aryl group, and (d) a catalytic amount of a dialkyl-sulfoxide; and (II) maintaining the mixture at a temperature at which (a) and (b) react in the presence of (c) and (d) to produce an aromatic isocyanate containing an imido group.

The anhydrides useful as reactants in the process of this invention are the anhydrides of organic polycarboxylic acids. Suitable anhydrides include those having the formula:

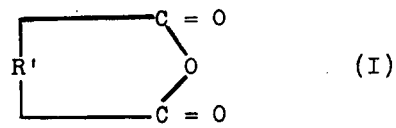

wherein R' is a divalent hydrocarbon group or divalent hydrocarbon group substituted by at least one halogen atom, active hydrogen-containing group or acyl halide (halogen-CO-) group. Illustrative of the groups represented by R' in formula (I) above are the halogen-substituted olefinically unsaturated divalent cyclo-aliphatic groups, the halogen-substituted arylene groups and groups represented by the formula:

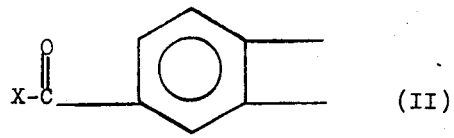

wherein X is HO or halogen. One such R' group is derived from chlorendic anhydride and is represented by the formula:

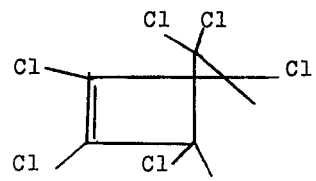

The anhydride groups in the above-described anhydrides are reactive with the isocyanato groups of the polyisocyanate reactants. The reaction of these groups produces imido groups. In addition, the optional active hydrogen-containing groups that may be present in the anhydride reactants (e.g., hydroxy groups or carboxy groups) are also reactive with the isocyanato groups of the polyisocyanate reactants, at least under certain conditions.

Illustrative of the anhydrides useful as reactants in the process of this invention are chlorendic anhydride, tetrabromophthalic anhydride, tetrachlorophthalic anhydride, pyromellitic dianhydride, trimellitic anhydride (the anhydride of trimellitic acid), hemimellitic anhydride, isatoic anhydride (the anhydride of N-carboxy anthranilic acid), hydroxyphthalic anhydride, methyl-trimellitic anhydride, 4'-carboxy diphenyl-1,3,4-dicarboxylic anhydride, benzophenone tetracarboxylic acid dianhydride, and di(phenyldicarboxylic anhydride)ether.

The polyisocyanates useful as reactants in the process of this invention are aromatic polysiocyanates. Suitable aromatic polyisocyanates include poly(aryleneisocyanates) having at least two aromatic rings with one isocyanato group on each ring. These aromatic rings are suitably interconnected by an ether, sulfone, sulfoxide, methylene, propylene, carbonyl linkage or by two methylene groups connected to a benzene ring substituted by an isocyanato group. The aromatic rings of the poly(aryleneisocyanate) can be substituted e.g., by methyl, ethyl or propyl groups. Suitable poly(aryleneisocyanates) include polymethylene poly(phenyleneisocyanates) having the formula:

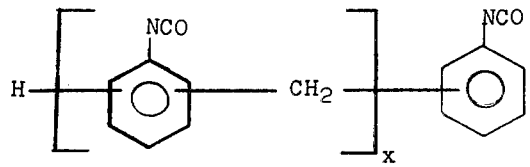

wherein $x$ has an average value from 1.1 to 5 inclusive (preferably from 2.0 to 3.0). Other suitable poly(aryleneisocyanates) include 4,4'-diphenylmethylene diisocyanate; 3,3'-diphenylmethylene diisocyanate; diphenyl diisocyanate; diphenylsulfone diisocyanate; diphenylsulfide diisocyanate; diphenylsulfoxide diisocyanate; and diphenylpropane diisocyanate. Other aromatic polyisocyanates include the isomeric tolylene and xylene diisocyanates and their residue products.

The catalyst combinations useful in this invention are composed of certain phosphorus or boron compounds and dialkylsulfoxides. The phosphorus and boron compounds have the formulas: $MB(R)_4$, $(R)_3P$, $(R)_4POOCR$ and $MP(F)_6$ where M is an alkali metal and R is an alkyl group or; an aryl group.

Typical of the alkyl groups represented by R in the above formulas are the methyl, ethyl, propyl, butyl, pentyl, hexyl, decyl and dodecyl groups and their aryl-substituted derivatives (e.g., the benzyl and beta-phenyl ethyl groups). Typical of the aryl groups represented by R in the above formula are the phenyl and naphthyl groups and their alkyl-substituted derivatives (e.g., the tolyl group). Illustrative of such catalysts are dimethylsulfoxide, triphenyl phosphine, tetrabutyl-phosphonium acetate, sodium tetraphenyl boron and lithium hexafluorophosphate.

To insure that the product of the process of this invention contains an isocyanato group, reaction mixture used in the process can contain the anhydride and polyisocyanate reactants in relative amounts such that there is at least one isocyanato group per polyisocyanate molecular in excess of the amount of isocyanato groups required to react with the groups in the anhydride reactive with isocyanato groups. Generally, it is desirable that an even greater excess of the polyisocyanate be used so that the reaction product is a solution of an imido-isocyanate dissolved in unreacted polyisocyanate (the polyisocyanate is normally a liquid). Alternatively, equivalent amounts of isocyanato groups and groups reactive herewith can be present in the reaction mixture and advantage can be taken of the fact that the isocyanate-anhydride reaction occurs at a greater rate than the reaction of isocyanato groups with certain other groups (e.g., carobxy groups), if any, in the anhydride reactant that are also reactive with isocyanate groups. In such cases the reaction can be discontinued (e.g., by lowering the temperature of the reaction mixture) as soon as the isocyanate-anhydride reaction has gone to completion. This point can be assumed to have been reached at the time the theoretical amount of carbon dioxide produced as a by-product in the isocyanate-anhydride reaction has been evolved from the reaction mixture. On the other hand, an excess of the polyisocyanate should be used when the anhydride contains a group (e.g., an COOH group) that is more reactive with isocyanato group than is the anhydride groups. When it is desired to produce a solution of the imido isocyanate dissolved in unreacted liquid polyisocyanate reactant, reactants of relatively low functionality (reactive groups per molecule) and a large excess of the polyisocyanate reactant should be employed.

The relative amounts of the catalysts employed in the process of this invention is not narrowly critical. It is preferable that the phosphorus or boron compound be present in an amount of 0.02 to 20 parts by weight per hundred parts by weight of the total weight of the anhydride and the polyisocyanate reactants. It is preferable that the dialkyl sulfoxide compound be present in an amount of 0.1 to 5 parts by weight per hundred parts by weight of the total weight of the anhydride and the polyisocyanate reactants.

The process of this invention is conveniently conducted by forming an admixture of the anhydride and polyisocyanate reactants under an inert atmosphere (e.g., under a nitrogen atmosphere). The catalyst combination can be added to the admixture to produce a reaction mixture which is maintained at a temperature of from 25°C. to 200°C. under the inert atmosphere to cause the anhydride and the polyisocyanate to react to produce the imido isocyanate. The progress of the reaction can be followed by measuring the amount of carbon dioxide evolved as a by-product in the reaction of the anhydride and isocyanate groups to form the imido group. It is usually necessary to gradually increase the reaction temperature during the course of the reaction to insure completion of the reaction (i.e., to promote the evolution of the theoretical amount of carbon dioxide).

The imido isocyanates produced by the process of this invention can be used as such in various applications (e.g., in the production of rigid polyurethane foams as described below) without further processing (e.g., it is not necessary to remove the catalysts).

When a halogenated anhydride reactant is employed in the process of this invention (e.g., where the anhydride reactant is represented by formula (I) above wherein R' is a halogenated-substituted divalent hydrocarbon group as illustrated by the group present in chlorendic anhydride), the imido isocyanates are novel compositions characterized by their utility as components in polyurethane-foaming formulations that are rapidly convertible to rigid polyurethane foams employing only conventional amine and tin catalysts as the curing agents. This is a desirable property not found in imido isocyanates produced from certain non-halogenated anhydrides (e.g., trimellitic anhydride). Foam formulations containing the latter imido isocyanates are only slowly convertible to polyurethane foams when only conventional amine and tin catalysts are used as curing agents.

Thus rigid polyurethane foams can be produced by a method which comprises reacting and and foaming a foam formulation containing (a) an imido isocyanate produced as described above, (b) an aromatic polyisocyanate (such as the aromatic polyisocyanates described above as useful as reactants in the process of this invention), (c) a polyether polyol having a hydroxyl number from 200 to 800, (d) a foam stabilizer (e) a blowing agent and (f) a catalyst for the reaction of (a) and (b) with (c) to produce a polyurethane. Components (c), (d), (e) and (f) in the above described foam formulations include the various polyether polyols, foam stabilizers, blowing agents and catalysts used in producing conventional rigid polyurethane foams. Component (b) is employed in the foam formulation to provide sufficient isocyanato groups for reaction with the polyol to product the requisite polyurethane polymer. Normally, the imido isocyanate itself contains insufficient isocyanato groups for this purpose. It is often convenient to form an admixture of components (a) and (b) prior to using these components in producing rigid polyurethane foams. Such admixtures can be the product of the process of two inventions in those cases where excess polyisocyanate reactant is employed. The viscosity of such admixtures is lower than the viscosity of component (a) alone and so the storage and handling of component (a) is facilitated by forming such admixtures. Preferably, such admixtures contain from 2 to 10 moles of component (b) per mole of component (a). If desired, component (e) can be added to such admixtures to reduce the viscosity thereof to facilitate handling and storage even further.

The polyether polyols used in the foam formulations include the various polyether polyols used in producing conventional polyurethane foam. Illustrative of such polyols are the reaction products of compounds containing at least three OH and/or NH groups ("starters") with one or more vicinal epoxides. Suitable starters are alpha-methyl glucoside, sucrose, pentaerythritol, trimethylolpropane, ethylene diamine, sorbitol, diethylenetriamine, and the like. Suitable epoxides are ethylene oxide, 1,2-propylene oxide and mixtures thereof. Lactones (e.g., epsilon-caprolactone) can be included as a coreactant with the starter and epoxide to incorporate lactone units in the polyol. A minor amount of the polyol component can consist of a polyol produced using a phosphorus acid as a starter.

The foams are stabilized during production by any of the known surfactant stabilizers, including the poly(siloxane-oxyalkylene) block copolymers described and claimed in U.S. Pat. No. 2,834,748 and British Patent Specification No. 1,143,206. Preferred block copolymers are a liquid siloxane-oxyalkylene block copolymers represented by the formula:

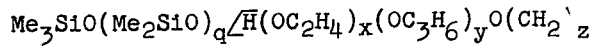

wherein Me is a methyl group, q has a value from 3 to 25 inclusive, $x$ has a value from 1 to 25 inclusive, $y$ has a value from 0 to 15 inclusive, at least 25 weight percent of the groups represented by

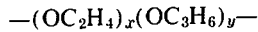

are oxyethylene groups, z is 2 or 3, p has a value from 1 to 10 inclusive, and the hydroxyl groups constitute at least 1.5 weight percent of the copolymer.

The foam formulations can also include a phosphorus-containing polyol. Such polyols are desirable where a flame retardant foam is to be produced. Phosphorus-containing polyols can be produced by reacting a phosphorus-containing acid with one or more vicinal epoxides. Suitable phosphorus-containing acids are phosphoric acid, orthophosphoric acid, orthophosphorous acid and the like. A dicarboxylic acid anhydride can also be present as a co-reactant with the phosphorus-containing acid and the epoxide in producing the phosphorus-containing polyol. A preferred class of phosphorus-containing polyols can be represented by the formula:

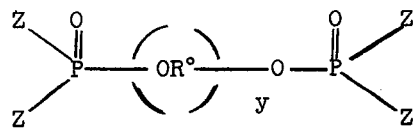

wherein R° represents the divalent residue of a vicinal epoxide; y represents a number having a value of at least 1; and each Z individually represents a group having the formula:

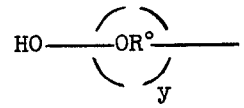

wherein the variables R and y have the same significance as stated above, or a group having the formula:

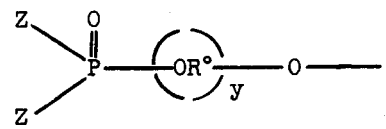

wherein the variables R°, y, and Z have the same significance as stated above.

When flame retardant foams are desired, the foam formulations can also contain an organic flame retardant. Such flame retardants include 2,2-di(bromomethyl)-1,3-propanediol, $(ClCH_2CH_2O)_3$-P(O), 2,3-dibromopropanol, brominated phthalate ester diols (e.g., condensation product of tetrabromophthalic anhydride, diethylene glycol, and propylene oxide), oxypropylated phosphoric acid polyol phosphites (e.g., tris(dipropylene glycol)phosphite), polyol phosphonates (e.g., bis(dipropylene glycol hydroxymethane phosphonate), tris(2,3-dibromopropyl)phosphate, tris(1,3-dichloropropyl)phosphate, tetrabromobisphenol-A, tetrabromophthalic anhydride, 2,4,6-tribromophenol, pentabromophenol, tris(1-bromo-3-chloroisopropyl)phosphate, bromo anilines and dianilines, diethyl-N,N-bis(2-hydroxyethyl) aminomethyl phosphonate, di-polyoxyethylene hydroxymethyl phosphonate, 0,0-diethyl-N,N-bis(2-hydroxyethyl) aminomethyl phosphonate, di-polyoxypropylene phenyl phosphonate, di-polyoxypropylene chloromethyl phosphonate, and di-polyoxypropylene butyl phosphate.

The blowing agents useful in the foam formulations include water, the fluorinated alkanes such as trichlorofluoromethane, dibromotetrafluoroethane, trichlorotrifluoroethane, and the like. Also suitable are methylene chloride and low boiling alkanes such as ethane, propane, and the like; although any of the known blowing agents used in the production of urethane foam can be used.

The catalysts useful in the foam formulations include organic tin compounds, amines, antimony carboxylates and antimony alcoholates. Illustrative of suitable organic tin catalyst are dialkyltin salts of carboxylic acids, e.g., dibutyltin diacetate, dibutyltin dilaurate, dibutyltin maleate, dilauryltin diacetate, dioctyltin diacetate, dibutyltin-bis(4-methylaminobenzoate), dibutyltin-bis(6-methylaminocaproate), and the like. Illustrative of suitable amine catalysts are diethylenetriamine, triethanolamine, triethylenediamine, N-(2-hydroxyethyl-)ethyleneimine, triethylamine, N-methylmorpholine, N,N-dimethylbenzylamine, N,N-dimethylethanolamine, and the like, and including all those amine catalyst known to be suitable in the production of urethane polymers. When the anhydride used in making the imido isocyanate is non-halogenated, the rate of cure of the formulation is relatively slow. In such cases, preferred catalysts used in the foam formulations are those having the formulas $Sb(OOCR'')_3$ and $Sb(OR''')_3$ wherein $R''$ is an alkyl group having from 1 to 20 carbon atoms inclusive and $R'''$ is an alkyl group having from 1 to 10 carbon atoms inclusive. Illustrative of those preferred catalysts are antimony acetate, antimony propionate, antimony butyrate, antimony pentoate, antimony hexoate, antimony octoate, antimony decoate, antimony hendecoate, antimony dodecoate, antimony tetradecoate, antimony octodecoate, antimony eicosoate, antimony trimethoxide, antimony triethoxide, antimony tripropoxide, antimony triisopropoxide, antimony tributoxide, antimony triisobutoxide, antimony tripentoxide, antimony trihexoxide, antimony trioctoxide, antimony tridecoxide, and the like.

In carrying out the reaction to produce the polyurethane foam from the above-described formulations, the methods known for producing rigid polyurethane can be employed. In a typical procedure for the production of the foams by the method of this invention all of the ingredients, except the imidoisocyanate and the aromatic polyisocyanate are mixed together at about room temperature. Then the imidoisocyanate and the aromatic polyisocyanate are added to the mixture all at once and it is stirred vigorously for a few seconds, poured into a mold and the mixture is permitted to react and foam. Indication of the rate of reaction is determined by measurement of the cream time, rise time, and tack-free time. Although curing beyond the spontaneous curing that occurs in a few seconds is not essential, such post curing can be conducted to effect the same degree of cure in a short period of time for investigation of relative comparisons in properties as in the Examples appearing below.

The rigid polyurethane foams produced as described above are useful in the same areas as conventional rigid polyurethane foams. For example, the foams can be used as thermal insulation between the metal surfaces of panels used in constructing buildings.

The following Examples illustrate the present invention.

In the following Examples, the symbols, designations and abbreviations used have the indicated meanings:

MEANINGS OF SYMBOLS, DESIGNATIONS AND ABBREVIATIONS

| Symbol, Designation or Abbreviation | Meaning |
|---|---|
| Catalyst D-22 | dibutyl tin dilaurate |
| cps. | centipoises |
| DMSO | dimethylsulfoxide |
| eq. | equivalent |
| "Fyrol 6" | $(C_2H_5O)_2\overset{O}{\underset{\|}{P}}CH_2N(CH_2CH_2OH)_2$ |
| g. | grams |
| in. | inch |
| Isocyanate I | A mixture of 80 wt-% 2,4-tolylene diisocyanate and 20 wt-% of 2,6-tolylene diisocyanate. |
| Isocyanate II | $H-[\text{C}_6H_3(NCO)-CH_2-]_x\text{C}_6H_4NCO$ where x has an average value of 1.3, vis. 45 cps.; 32.5% NCO. |
| Isocyanate III | A reaction product of excess Isocyanate I and glycerine. The reaction product contains 28% NCO. |

—Continued
MEANINGS OF SYMBOLS, DESIGNATIONS AND ABBREVIATIONS

| Symbol, Designation or Abbreviation | Meaning |
|---|---|
| Isocyanate IV | 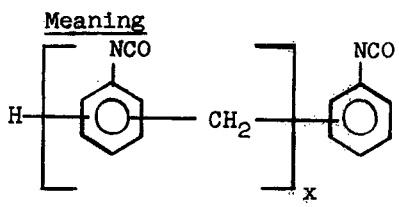<br>where x has an average value of 1.7, vis. 400 cps.; 31.4% NCO. |
| min. | minute |
| ml. | milliliters |
| ∅ | phenyl |
| ∅₃P | triphenyl phosphine |
| % | percent by weight |
| pcf | pounds per cubic foot |
| phr. | parts by weight per 100 parts by weight |
| Polyol I | A polyether polyol produced by reacting sucrose with a mixture containing 78% ethylene oxide and 22% 1,2-propylene oxide. The polyol has a hydroxyl number of 450. |
| Polyol II | 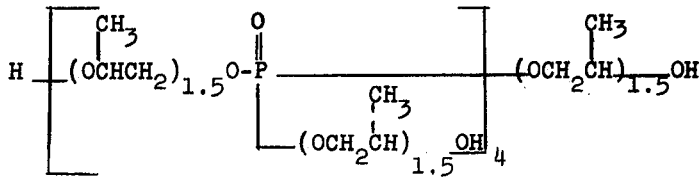 |
| psi. | pounds per square inch |
| sec. | second |
| Surfactant I | A mixture of:<br>50% $Me_3SiO(Me_2SiO)_{13}(Me\overset{HO(C_2H_4O)_7(CH_2)_3}{SiO})_{5.5}SiMe$<br>40% $HO(C_3H_6O)_{1.6}(C_2H_4O)_{2.1}C_4H_9$ (diluent)<br>10% $CH_2=CHCH_2O(C_2H_4O)_7H$ (unreacted starting material) |
| TMBDA | tetramethylbutane diamine |
| "UCON 11B" | trichlorofluoromethane containing 0.3% allo ocimine |
| vis. | viscosity at 25°C. |
| wk. | week |
| wt. | weight |

The following foaming characteristics and foam properties were observed or measured with regard to various polyurethane foams produced as described below.

*Cream Time* The interval of time from the formation of the complete foam formulation to the appearance of a creamy color in the formulation. The cream time is proportional to the rate of reaction of the formulation.

*Rise Time* The interval of time from the formation of the complete foam formulation to the attainment of the maximum height of the foam.

*Tack Free Time* The interval of time from the formation of the complete foam formulation to the disappearance of the tacky feel from the surface of the resulting polyurethane foam.

*Penetration Time* A piece of filter paper is placed on top of a foam specimen. The dimensions of the foam speciment are $1 \times 6 \times 6$ inches. The foam specimen is then placed three inches above the top of a Bunsen burner. The burner flame temperature is $1178°C \pm 8°$. The distance from the point of the inner cone of the burner flame to the under side of the foam specimen is adjusted to 1.5 inches. The time required for the flame to penetrate thru the specimen and char the filter paper is the Penetration Time.

*Cell Structure Appearance* The appearance of the structure of the cells of a polyurethane foam is arbitrarily denoted by three-digit number. The first digit indicates cell size (the number 1 denotes fine cells, 2 denotes medium cells and 3 denotes large cells). The second digit indicates uniformity of cell size (the number 1 denotes good cell uniformity, 2 denotes fair cell uniformity and 3 denotes poor cell uniformity). The third digit indicates bulk (gross) flaws, e.g., splits, ridges, scorch, holes and/or poor mix (marble effect) [the number 1 denotes no bulk flaws, 2 denotes minor bulk flaws and 3 denotes severe bulk flaws].

*Core Density* Density of sample of foam taken from center (core) of foam "bun."

| Burning Extent | Determined by ASTM D 1692-67T |
| --- | --- |
| SE | |
| Burning | (modified to the extent that |
| Extinguishing | |
| Time | 5 foam specimens are used |
| Burning Rate | |
| | rather than 10) as follows |

The flame of a Bunsen burner having an inner blue cone of about 1.5 inches in height is applied separately to the front edges of five foam specimens. The dimensions of the specimens are $6 \times 2 \times 0.5$ inches. The flame is allowed to remain in contact with the specimens for about 60 seconds. The extent of burning (Burning Extent) of the foam is the average distance from the front edge of the specimens to the furthermost point on the specimens reached by the flame front. A foam is rated self-extinguishing (SE) when each of the five specimens have a Burning Extent of less than five inches. If the Burning Extent of one or more of the specimens is at least 5 inches, the foam is rated Burning. The average time interval from the application of the flame to the specimens to the cessation of burning (due to total comsumption of the specimen or to the flame dying out) is the Extinguishing Time of the foam. The Burning Rate of a foam is its Burning Extent divided by its Extinguishing Time.

EXAMPLE I

This Example illustrates the process of this invention when Isocyanate I (a mixture of tolylene diisocyanates described above) and chlorendic acid anhydride are reacted in the presence of triphenyl phosphine and dimethylsulfoxide.

A 2-liter 4-necked flask equipped with a Trubor stirrer, nitrogen gas inlet tube, thermometer and an outlet protected by a drying tube was dried by heating with a hot-air gun while passing nitrogen gas through the apparatus. When the dried apparatus had cooled to room temperature 348 g. (2.0 mole) of Isocyanate I and 185.5 g. (0.5 mole) of chlorendic anhydride were placed in the flask. The nitrogen inlet was stoppered and a tube was connected from the drying tube to a gas metering device. To the reaction mixture slurry was added a solution of 0.5 g. of triphenyl phosphine dissolved in 10 ml. of dimethyl sulfoxide all at one time. The mixture was slowly heated with stirring and gas evolution commenced just slightly above room temperature. The temperature was raised periodically to maintain evolution of carbon dioxide. After 5 hours of reaction time the temperaure had reached a maximum of 180°C. and 11,200 ml. (0.5 mole; 100% yield) of gas (identified as $CO_2$ by mass spectrometry) had been evolved. The black liquid residue product was a solution containing 50 wt-% Isocyanate I and 50 wt-% of an imido isocyanate having the formula:

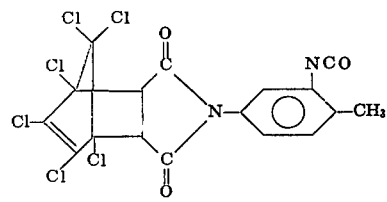

The solution had the following characteristics:

| | Found | Calculated |
| --- | --- | --- |
| NCO % | 28.70 | 28.75 |
| Cl, % | 20.97 | 20.70 |
| Viscosity, cps at 25°C after 8 weeks: | 211 | |
| Infrared: | Band at (Microns) | Structure |
| | 5.59 & 5.81 | $\overset{O}{\underset{\|}{-C}}N\text{-}\overset{O}{\underset{\|}{C}}-$ (imide) |
| | 4.45 | -NCO (isocyanate) |

—Continued

No bands attributable to carbodiimide (4.65-4.70 microns) or isocyanurate (5.65-5.94 (triplet) and 7.15 microns) were evident.

Equivalent weight (g/eq): 146

The reactions described in Examples II, III, IV and VI below were carried out following the general procedure described in Example I above.

EXAMPLE II

A series of acidic and basic compounds were examined as possible catalysts for the production of imidoisocyanates from chlorendic anhydride and Isocyanate I. In those cases where dimethylsulfoxide was used, the other compounds used as catalysts were dissolved in the dimethylsulfoxide just prior to introducing them into the reaction mixture. In the first two experiments, 1.0 mol of the anhydride was used, and in the other experiments, 0.5 mol was used. In the first experiment, 1.0 mol of the isoycanate was used and, in the other experiments, 2.0 moles were used. The progess of the reactions were followed by measuring the amount of carbon dioxide evolved with time.

I) while the uncatalyzed reaction solidified before the reaction was 100 per cent complete, i.e., before the theoretical quantity of carbon dioxide had been liberated. Of the liquid products, however, only those produced using a combination of $\phi_3P$ (triphenylphosphine) and DMSO (dimethylsulfoxide) as catalysts maintained their liquid character without evidence of solids formation. Also, there was no evidence of viscosity increase after standing for two months with the latter catalyst combination (not shown in Table I).

EXAMPLE III,

The effect of various compounds as catalysts for the reaction of chlorendic anhydride with Isocyanate II [a polymethylene poly(phenylene isocyanate) described above] was studied. All reactions employed 371 g. (1 eq.) of chlorendic anhydride, 270 g. (2.07 NCO eq.) of

TABLE I

CATALYSTS FOR REACTION OF CHLORENDIC ANHYDRIDE AND ISOCYANATE I

| Run | Catalysts Compound (grams) | DMSO (ml.) | Conditions for $CO_2$ Evolution | | | | Product Description |
|---|---|---|---|---|---|---|---|
| | | | Temperature, °C Initial | Final | Hours | Yield, % | |
| 1. | None | None | 212 | 225 | 4 | 28 | Black solid |
| 2. | None | None | 202 | 225 | 7 | 92 | Black solid |
| 3. | None | 10 | 140 | 197 | 9 | 100 | Black liquid (trace of solids). 70% solids in 2 weeks. |
| 4. | LiCl, 0.50 | 10 | 72 | 124 | 9 | 97 | Black liquid-solidified in 3 days. |
| 5. | CsF, 0.50 | 10 | 75 | 188 | 12 | 100 | Black liquid-5% solids in 15 days. |
| 6. | $(CH_3)_4N^+I^-$, 0.50 | 10 | 103 | 156 | 6 | 82 | Black liquid-20% solids in 9 days. |
| 7. | $Sb(i-C_3H_7O)_3$, 0.50 | 10 | 138 | 195 | 5 | 100 | Black liquid-75% solids in 14 days. |
| 8. | $\phi_3P$, 0.50 | 10 | 161 | 183 | 3 | 100 | Black liquid, vis. 211 cps after 8 weeks. |
| 9. | *$Zn(OAc)_2$, 0.50 | 10 | 173 | 200 | 2.25 | 100 | Black liquid-30% solids in 11 days. |
| 10. | $Ti[OCH(CH_3)_2]_4$, 0.50 | 10 | 134 | 198 | 3.75 | 100 | Black liquid-contained 5% solids in 11 days. |
| 11. | $Bu_4P^+Ac^-$, 0.50 | 10 | 132 | 194 | 4.0 | 100 | Black liquid. Contained 70% solids in 10 days. |
| 12. | Pyridine N-oxide, 0.50 | 10 | 164 | 190 | 3.5 | 100 | Black liquid. Contained 30% solids in 9 days. |
| 13. | Iodine, 0.50 | 10 | 162 | 201 | 4 | 100 | Solidified in one week. |
| 14. | p-Toluenesulfonic Acid, 0.50 | 10 | 135 | 202 | 5 | 100 | 15% solids in 1.5 weeks. |

*Zinc Acetate

As shown in Table I, all compounds studied were effective catalysts insofar as they either caused the reaction to proceed at lower temperatures or in a shorter time as compared to the uncatalyzed reaction. All products isolated from the catalyzed reactions were initially liquid (imido isocyanates dissolved in Isocyanate Isocyanate II, and 0.2 wt.-% of catalyst based on the total weight of the anhydride and Isocyanate II. Except in Runs 3, 5 and 13, the initial reaction products were dissolved while still hot in 522 g. (6 eq.) of Isocyanate I to produce solutions. These reactions are summarized in Table II below.

TABLE II.—CATALYSTS FOR REACTION OF CHLORENDIC ANHYDRIDE AND ISOCYANATE II

| Run | Catalysts compound, g. | DMSO, ml. | Conditions for $CO_2$ evolution | | | Yield, percent | Product solution properties | | | | NCO, percent |
|---|---|---|---|---|---|---|---|---|---|---|---|
| | | | Temperature, °C Initial | Final | Hours | | Description | Viscosity, cps. (25° C.) Initial | 2 wks. | 4 wks. | |
| 1 | # $\phi_3P$, 0.96 | 10 | 129 | 196 | 3.5 | 56 | Solidified to brittle solid | | | | |
| 2 | None | None | 202 | 235 | 2.3 | 100 | Black liquid | 1,480 | 1,610 | 1,844 | |
| 3 | ...do... | 10 | 75 | 198 | 5.3 | 100 | Black brittle solid formed | | | | |
| 4 | $\phi_3P$, 0.96 | None | 180 | 230 | 4.3 | 100 | Viscous black liquid. Some solids in 4 wks. | 69,960 | 136,000 | | |
| 5 | $LiPF_6$, 0.96 | 10 | 72 | 199 | 4.3 | 100 | Black liquid | 339 | 400 | 472 | 27.05 |
| 6 | $\phi_3P$, 0.96 | 10 | 80 | 197 | 4.3 | 100 | ...do... | 391 | 407 | 411 | 27.85 |
| 7 | $\phi_3PO$, 0.96 | None | 194 | 232 | 3.5 | 100 | ...do... | 8,962 | 11,760 | 12,244 | |
| 8 | $Bu_4P^+OAc^-$, 0.96 | 10 | 101 | 204 | 2 | 100 | ...do... | 340 | 379 | 413 | 27.43 |
| 9 | $Bu_4P^+OAc^-$, 0.96 | None | 180 | 230 | 4 | 100 | ...do... | 847 | 1,000 | 1,185 | |
| 10 | $NaB\phi_4$, 0.96 | 10 | 122 | 191 | 4.5 | 100 | ...do... | 413 | 436 | | 27.90 |
| 11 | CuCl, 0.96 | None | 204 | 235 | 3.7 | 100 | ...do... | | | | |
| 12 | $Co(BF_4)_2$, 0.96 | 10 | 25 | 200 | 4.7 | 100 | ...do... | 2,840 | 3,508 | 4,736 | |
| 13 | None | 9* | 162 | 169 | 2.5 | 25 | Added DMSO in increments | | | | |

*DMSO added in increments. Uncontrollable reaction ensued when 9 ml. of DMSO had been added. Product discarded.
Control. Employed only isocyanate II (omitted the chlorendic anhydride). Formation of solid indicates carbodiimide formation from NCO groups.

A comparison of Table I and Table II shows that the effect of catalysts on the reaction of chlorendic anhydride with Isocyanate II was quite different from that observed when Isocyanate I was employed with that anhydride. With Isocyanate II, the uncatalyzed reaction (see Run 2 of Table II) proceeded, quite smoothly at 202 to 235°C. over a period of 2.3 hours to give a liquid product as contrasted with the solid product produced at higher temperatures and longer reaction times with Isocyanate I (see the first two Runs in Table I). The Isocyanate I solution of the imido isocyanate of Run 2 of Table II slowly increased in viscosity during one month on ambient storage. With the exception of cuprous chloride, all the compounds investigated as catalysts as described in this Example exhibited a lowering of temperature for reaction as compared to the uncatalyzed reaction and also produced liquid products. However, triphenylphosphine, tetrabutylphosphonium acetate, sodium tetraphenylboron, and lithium hexafluorophosphate in combination with DMSO (dimethylsulfoxide) provided imido isocyanates whose Isocyanate I solutions had viscosities roughly one-fourth to one-third that of the uncatalyzed reaction (compare Runs 5, 6, 8 and 10 with Run 2), and only those solutions formed no solids on standing.

The products of Tables I and II above all exhibited strong absorption bands at 5.60 and 5.82 microns attributable to imide type carbonyl

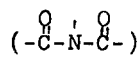

and at 4.44 microns attributable to NCO.

EXAMPLE IV

Larger scale experiments were conducted involving the reaction of various polyisocyanates with chlorendic anhydride in the presence of triphenyl phosphine ($\phi_3P$) and dimethylsulfoxide (DMSO). These experiments are summarized in Tables III and IV below.

The reactions were run on a 1-gallon scale and proceeded smoothly with the liberation of carbon dioxide as noted by footnotes $b$ to $f$ in Table III below. With the exception of Runs 3 and 5 of Table III, reaction times of about 4 to 5 hours at temperatures from 70° (initial carbon dioxide evolution) up to 195°C were sufficient to ensure quantitative evolution of carbon dioxide (i.e., the amount of $CO_2$ calculated as a by product of the reaction of the anhydride groups with the isocyanato groups to produce imide groups). For Runs 3 and 5 of Table III, reaction times of about 8 hours were required for quantitative evolution of carbon dioxide. The products of Runs 2, 4 and 5 were dissolved in Isocyanate I while hot or heated and then dissolved in Isocyanate I. The moles shown in Table III are gram-moles.

TABLE III

IMIDO ISOCYANATES FROM CHLORENDIC ANHYDRIDE AND POLYISOCYANATES

| Run No. | | Chlorendic Anhydride (moles) | Isocyanate Reactant | | | | Catalysts | | Isocyanate I |
|---|---|---|---|---|---|---|---|---|---|
| | | | I mole | II moles | III moles | IV moles | $\phi_3P$(g.) | DMSO(ml.) | Diluent (moles) (a) |
| 1 | (b) | 4.0 | 16.0 | — | — | — | 4.0 | 20 | — |
| 2 | (c) | 4.0 | — | 3.64 | — | — | 3.8 | 20 | 12.0 |
| 3 | (d) | 2.4 | — | 8.0 | — | — | 2.2 | 20 | — |
| 4 | (e) | 3.0 | — | — | 12.0 | — | 2.7 | 15 | 6.0 |
| 5 | (f) | 3.6 | — | — | — | 9.0 | 3.3 | 20 | 3.0 |

| (a) | Isocyanate I added to reaction product as a diluent in order to increase NCO content | | | |
|---|---|---|---|---|
| (b) | Quantitative yield of $CO_2$ collected at | 72–189°C. | during | hours. |
| (c) | do. | 70–195°C. | do. | 4 hours. |
| (d) | do. | 72–194°C. | do. | 7.5 hours. |
| (e) | do. | 180–195°C. | do. | 5.5 hours. |
| (f) | do. | 60–188°C. | do. | 8 hours. |

TABLE IV

PROPERTIES OF IMIDO ISOCYANATES FROM CHLORENDIC ANHYDRIDE AND POLYISOCYANATES

| Run | Product* Properties Calculated | | | Product* Properties, Observed | | | | | | | | |
|---|---|---|---|---|---|---|---|---|---|---|---|---|
| | Functionality** | Cl, % | NCO % | Eq. wt. | Acidity, wt. % HCl | Cl, % | NCO % | Viscosity at 25°C. in centipoises | | | | |
| | | | | | | | | Initial | 1 wk. | 2 wk. | 4 wk. | 8 wk. |
| 1 | 1.75 | 20.7 | 28.75 | 150.5 | 1.75 | 20.97 | 27.89 | 220 | 359 | — | 508 | 552 |
| 2 | 1.84 | 19.05 | 26.60 | 156 | 1.07 | 18.82 | 27.00 | 506 | 558 | — | 596 | 621 |
| 3 | 2.0 | 17.50 | 23.00 | 192 | 1.11 | 15.97 | 21.92 | 28,280 | 30,010 | 34,450 | 39,360 | 34,200 |
| 4 | 2.00 | 11.90 | 41.30 | 164.5 | 0.267 | 12.48 | 25.45 | 74,000 | — | — | 54,880 | 49,300 |
| 5 | — | 15.46 | 22.65 | 186.5 | 0.83 | 15.76 | 22.41 | 360,000 | 338,640 | — | 473,700 | 335,600 |

*After dilution, if any, as shown in Table III
**Functionality denotes number of free NCO groups per molecule.

The product property data in Table IV show that the percent of NCO and percent chlorine were in good agreement with the calculated values. The low NCO value observed for the Isocyanate III based product (Run 4) can be explained by the favorable reaction conditions for allophonate formation (allophonates are formed by reaction of the NH of urethane groups with NCO). Average functionalities (average number of NCO per molecule) were adjusted to 1.75 or greater by control of the anhydride-isocyanate ratio in the initial reaction mixture as well as by control of the amount of the Isocyanate I diluent, if any, added to the imide isocyanate product. The viscosity date in Table IV show that all products or product solutions remained liquid after two months at laboratory ambient conditions. The acidity values shown in Table IV indicate that there is insufficient acidity to impede the urethane-forming

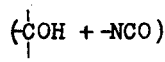

reaction.

The imido isocyanates and imido isocyanate solutions produced in Runs 1 thru 5 of Example III above are referred to below as "Imido Isocyanates 1 through 5" respectively.

EXAMPLE V

The imido isocyanates and imido isocyanate solutions produced as described in Example III above (Imido Isocyanates 1 through 5) were used to produce rigid polyurethanes as described below. Each imido isocyanate or imido isocyanate solution was mixed with sufficient supplemental Isocyanate IV [a polymethylene poly(phenylene isocyanate) described above] so that the resulting "isocyanate component" provided 5 mole % excess of NCO groups for reaction with the polyol. The foams were produced using the following mixing, foaming and curing procedure: All foam components, with the exception of the isocyanate component, were preblended with vigorous stirring for 20 seconds in a one liter stainless steel beaker. The isocyanate component was then added and the mixture stirred for 15 seconds and poured into an 8×8×8 inch cardboard box. Cream, Rise, and Tack Free Times were recorded. All foams were firm at completion of foam rise, but to insure uniformity, the cured foams were postcured in an oven for 15 minutes at 70°C. Table V-A, Table V-B and Table V-C below summarize the formulations used to produce the polyurethane foams, the foaming characteristics of the formulations and the physical properties of the foams produced.

The basic formulation used in producing the foams of Table V-A consisted of the above-mentioned isocyanate component as well as a conventional polyether polyol (Polyol I), a conventional blowing agent (UCON 11B), a conventional foam stabilizer (Surfactant I), conventional urethane foam-forming catalysts (D-22 and TMBDA) and a conventional flame retardant ("Fyrol 6"). The compositions of these various conventional ingredients are given above under the heading "Meanings of Symbols, Designations and Abbreviations."

The basic formulation used in producing the foams of Table V-B was the same as the basic formulation used in producing the foams of Table V-A except that a phosphorous-containing polyol (Polyol II as described above) was used as an additional ingredient in the basic formulation of Table V-B. Polyol II was used in the basic formulation of Table V-B in order to improve the flame retardancy of the foams.

The basic formulation used in producing the foams of Table V-C was the same as the basic formulation used in producing the foams of Table V-A except that antimony catalysts were used as additional ingredients in the basic formulation of Table V-C in place of one or both of the conventional catalysts (TMBDA and D-22). Antimony catalysts were used in the basic formulation of Table V-C in order to increase the cure rate of the foams. The $Sb(OOCC_7H_{15})_3$ catalyst used in the basic formulation of Table V-C was used in the form of a mixture containing 50 weight percent of the catalyst and 50 weight percent of paraffin oil. The amount shown in Table V-C is the amount of the catalyst and not the amount of the mixture.

In Table V-A, Table V-B and Table V-C "% phosphorus" and "% chlorine" denote the weight percent of phosphorus and chlorine in the polyurethane polymer in the foam calculated based on the total weight of the polyol, isocyanate component and Fyrol 6 present in the formulation used to produce the foam. With regard to the foam densities shown in Table V-A, Table V-B and Table V-C, it should be noted that the foam density for a given foam is not necessarily the same in different tests performed on the foam. The foam "buns" produced were not of uniform density and the foam specimens used in the tests were taken from different sections of the bun.

TABLE V-A.—RIGID POLYURETHANE FOAMS PRODUCED FROM IMIDO ISOCYANATES

| Foam number | 1 | 2 | 3 | 4 | 5 | 6 | 7 | 8 | 9 | 10 | 11 | 12 | 13 |
|---|---|---|---|---|---|---|---|---|---|---|---|---|---|
| Formulation, parts by weight: | | | | | | | | | | | | | |
| Polyol I | 100 | 90 | 80 | 100 | 100 | 100 | 100 | 100 | 100 | 100 | 100 | 100 | 100 |
| UCON 11B | 46 | 46 | 46 | 46 | 46 | 46 | 46 | 46 | 46 | 46 | 46 | 46 | 46 |
| Surfactant I | 3.0 | 3.0 | 3.0 | 3.0 | 3.0 | 3.0 | 3.0 | 3.0 | 3.0 | 3.0 | 3.0 | 3.0 | 3.0 |
| Catalyst D-22 | 0.40 | 0.40 | 0.40 | 0.40 | 0.40 | 0.40 | 0.40 | 0.40 | 0.40 | 0.40 | 0.40 | 0.40 | 0.40 |
| TMBDA catalyst | 0.80 | 0.80 | 0.80 | 0.80 | 0.80 | 0.80 | 0.80 | 0.80 | 0.80 | 0.80 | 0.80 | 0.80 | 0.80 |
| Isocyanate IV | 110.3 | 110.3 | 110.3 | 52.5 | 47.4 | 47.4 | 21.1 | 47.4 | | | | | |
| Fyrol 6 | | 10 | 20 | | | | | | | | | | |
| Imido-isocyanate 1 | | | | 70.7 | | | | | | 131 | | | |
| Imido-isocyanate 2 | | | | | 79.5 | | | | | | 135.6 | | |
| Imido-isocyanate 3 | | | | | | 96.6 | | | | | | 167 | |
| Imido-isocyanate 4 | | | | | | | 116.7 | | | | | 143 | |
| Imido-isocyanate 5 | | | | | | | | 93.95 | | | | | 162.4 |
| Percent phosphorus | | 0.57 | 1.15 | | | | | | | | | | |
| Percent chlorine | | | | 6.56 | 6.52 | 6.25 | 6.05 | 6.08 | 11.73 | 10.70 | 9.88 | 7.25 | 9.60 |
| Foaming characteristics: | | | | | | | | | | | | | |
| Cream time, sec | 43 | 28 | 23 | 100 | 105 | 130 | 35 | 70 | 120 | 70 | 60 | 35 | 55 |
| Rise Time, sec | 125 | 85 | 75 | >900 | 420 | 740 | 200 | 500 | >720 | 555 | >720 | 230 | >720 |
| Tack free time, sec | 116 | 65 | 65 | 840 | 390 | 540 | 120 | 360 | >720 | 430 | 720 | 120 | 540 |

TABLE V-A.—RIGID POLYURETHANE FOAMS PRODUCED FROM IMIDO ISOCYANATES—Continued

| Foam number | 1 | 2 | 3 | 4 | 5 | 6 | 7 | 8 | 9 | 10 | 11 | 12 | 13 |
|---|---|---|---|---|---|---|---|---|---|---|---|---|---|
| Flammability by ASTM D 1692-67T: [a] | | | | | | | | | | | | | |
| Density, pcf | 1.74 | 1.52 | 1.51 | 1.63 | 1.69 | 1.88 | 1.73 | 1.89 | 1.60 | 1.59 | 2.14 | 1.74 | 2.01 |
| Rating | (b) | SE | SE | (b) | (b) | SE | (b) | (b) | (b) | (b) | (b) | (b) | SE |
| Extinguishing time, sec | | 60 | 60 | | | 60 | | | | | | | 51 |
| Burning extent, in | | 0.4 | 0.4 | | | 0.6 | | | | | | | 3.0 |
| Burning rate, in./min | 5.3 | 0.4 | 0.4 | 8.2 | 5.2 | 0.6 | 5.0 | 5.5 | 5.1 | 4.9 | 4.2 | 6.6 | 3.6 |
| Flammability by Bureau of Mines Flame Penetration Test: | | | | | | | | | | | | | |
| Density, pcf | 1.53 | 1.44 | 1.43 | | 1.55 | 1.68 | 1.60 | 1.73 | 1.58 | 1.55 | 1.91 | 1.65 | 2.10 |
| Penetration time, sec | 8.5 | 352.0 | 319.5 | | 212.5 | 1,173.0 | 9.0 | 1,294.0 | 11.5 | 87.0 | 1,627.5 | 8.0 | 1,473.5 |
| Weight loss, percent | 10.84 | 19.76 | 20.58 | | 27.25 | 24.52 | 12.34 | 25.88 | 11.49 | 28.91 | 24.22 | 11.60 | 22.24 |
| Mechanical properties: | | | | | | | | | | | | | |
| Cell structure appearance | 122 | 122 | | 122 | 121 | 122 | 121 | 122 | 222 | 122 | 122 | 122 | 122 |
| Core density, pcf | 1.61 | 1.49 | 1.48 | 1.69 | 1.62 | 1.72 | 1.64 | 1.75 | 1.66 | 1.68 | 1.99 | 1.66 | 2.02 |
| Closed cells, percent | 57.4 | 85.8 | 88.5 | 88.8 | 88.0 | 83.8 | 90.5 | 86.6 | 83.0 | 85.1 | 84.4 | 90.4 | 90.4 |
| Compressive strength [c] (25° C.): | | | | | | | | | | | | | |
| Parallel, p.s.i | 17.9 | 19.2 | 24.4 | 14.5 | 21.9 | 18.0 | 27.5 | 19.8 | 20.7 | 22.3 | 21.3 | 27.0 | 17.9 |
| Perpendicular, p.s.i | 7.6 | 7.7 | 7.4 | 14.5 | 9.8 | 13.2 | 9.5 | 13.2 | 9.1 | 8.2 | 19.7 | 11.9 | 16.3 |
| Friability, ASTM C367-C421: | | | | | | | | | | | | | |
| Density, pcf | 1.44 | 1.36 | 1.23 | | 1 | 1.72 | 1.49 | 1.62 | 1.34 | 1.55 | 1.81 | 1.52 | 1.78 |
| Weight loss, percent: | | | | | | | | | | | | | |
| 2 min | 1 | 1 | 0 | | 10 | 5 | 0 | 7 | 23 | 14 | 9 | 0 | 8 |
| 10 min | 16 | 9 | 9 | | 52 | 36 | 17 | 44 | 89 | 69 | 49 | 16 | 52 |

[a] Foam Number 9 exhibited intumescence. [b] Burning. [c] ASTM D 1621.

TABLE V-B

RIGID POLYURETHANE FOAMS PRODUCED FROM IMIDO ISOCYANATES AND PHOSPHORUS-CONTAINING POLYOL

| Foam Number | 1 | 2 | 3 | 4 | 5 | 6 | 7 | 8 | 9 | 10 |
|---|---|---|---|---|---|---|---|---|---|---|
| Formulation* | | | | | | | | | | |
| Polyol I | 100 | 90 | 80 | 90 | 80 | 100 | 100 | 100 | 100 | 100 |
| UCON 11B | 46 | 46 | 46 | 46 | 46 | 46 | 46 | 46 | 46 | 46 |
| Surfactant I | 3.0 | 3.0 | 3.0 | 3.0 | 3.0 | 3.0 | 3.0 | 3.0 | 3.0 | 3.0 |
| Catalyst D-22 | 0.40 | 0.40 | 0.40 | 0.40 | 0.40 | 0.40 | 0.40 | 0.40 | 0.40 | 0.40 |
| TMBDA Catalyst | 0.80 | 0.80 | 0.80 | 0.80 | 0.80 | 0.80 | 0.80 | 0.80 | 0.80 | 0.80 |
| Polyol II | — | 10 | 20 | — | — | 20 | 20 | 22 | 22 | 22 |
| Isocyanate IV | 110.3 | 106.8 | 103.3 | 110.3 | 110.3 | 55.3 | 50.2 | 50.5 | 21.1 | 47.4 |
| Fyrol 6 | — | — | — | 10 | 20 | — | — | — | — | — |
| Imido Isocyanate 1 | — | — | — | — | — | 70.7 | — | — | — | — |
| do. 2 | — | — | — | — | — | — | 79.5 | — | — | — |
| do. 3 | — | — | — | — | — | — | — | 96.6 | — | — |
| do. 4 | — | — | — | — | — | — | — | — | 120.6 | — |
| do. 5 | — | — | — | — | — | — | — | — | — | 98.35 |
| % Phosphorus | — | 0.537 | 1.09 | 0.57 | 1.15 | 0.89 | 0.88 | 0.90 | 0.92 | 0.91 |
| % Chlorine | — | — | — | — | — | 5.95 | 5.93 | 5.67 | 5.64 | 5.72 |
| Foaming Characteristics | | | | | | | | | | |
| Cream Time, sec. | 43 | 50 | 52 | 28 | 23 | 110 | 115 | 160 | 35 | 85 |
| Rise Time, sec. | 125 | 140 | 135 | 85 | 75 | >600 | 460 | 720 | 190 | 420 |
| Tack Free Time, sec. | 116 | 160 | 125 | 65 | 650 | >600 | 375 | 550 | 115 | 525 |
| Flammability by ASTM D-1692-67T (a) | | | | | | | | | | |
| Density, pcf | 1.74 | 1.58 | 1.55 | 1.52 | 1.51 | 1.76 | 1.70 | 2.04 | 1.85 | 1.98 |
| Rating | Burning | SE | SE | SE | SE | SE | SE | SE | SE | SE |
| Extinguishing time, sec. | — | 43 | 33 | 60 | 60 | 60 | 60 | 60 | 62 | 28 |
| Burning Extent, in. | — | 2.90 | 1.36 | 0.4 | 0.4 | 0.8 | 0.4 | 0.2 | 1.2 | 1.4 |
| Burning Rate, in./min. | 5.3 | 3.99 | 2.44 | 0.4 | 0.4 | 0.8 | 0.4 | 0.2 | 1.1 | 2.9 |
| Flammability by Bureau of Mines Flame Penetration Test | | | | | | | | | | |
| Density, pcf | 1.53 | 1.45 | 1.52 | 1.44 | 1.43 | 1.62 | 1.72 | 1.85 | 1.72 | 1.85 |
| Penetration Time, sec. | 8.5 | 25.0 | 426.5 | 352.0 | 319.5 | 190.5 | 371.5 | 1371.5 | 31.5 | 1327.0 |
| Weight Loss, % | 10.84 | 15.73 | 21.62 | 19.76 | 20.58 | 20.14 | 21.51 | 25.47 | 14.44 | 26.65 |
| Mechanical Properties | | | | | | | | | | |
| Cell Structure Appearance | 122 | — | — | 122 | — | 121 | 121 | 121 | 122 | 122 |
| Density, pcf (Core) | 1.61 | 1.58 | 1.55 | 1.49 | 1.48 | 1.75 | 1.72 | 1.92 | 1.79 | 1.89 |
| Closed Cells, % | 57.4 | 50.3 | 82.2 | 85.8 | 88.5 | 88.2 | 87.2 | 90.3 | 91.2 | 89.4 |
| Compressive Strength, 25°C. ASTM D-1621 | | | | | | | | | | |
| parallel, psi | 17.9 | 11 | 13 | 19.2 | 24.4 | 23.9 | 23.4 | 25.6 | 24.5 | 22.7 |
| perpendicular, psi | 7.6 | 4 | 4 | 7.7 | 7.4 | 10.2 | 10.4 | 21.1 | 12.2 | 11.7 |
| Friability, ASTM C367 and C421 | | | | | | | | | | |
| Density, pcf | 1.44 | 1.51 | 1.48 | 1.36 | 1.23 | 1.60 | 1.51 | 1.70 | 1.62 | 1.71 |
| Weight Loss, % | | | | | | | | | | |
| 2 min. | 1 | 1 | 2 | 1 | 0 | 8 | 6 | 3 | 0 | 2 |
| 10 min. | 16 | 8 | 12 | 9 | 9 | 44 | 37 | 21 | 8 | 16 |

*Parts by Weight
(a) Foam number 7 showed intumescence.

TABLE V-C

RIGID POLYURETHANE FOAMS PRODUCED FROM IMIDO ISOCYANATES AND ANTIMONY CATALYST

| Foam Number | 1 | 2 | 3 | 4 | 5 | 6 | 7 | 8 | 9 | 10 | 11 |
|---|---|---|---|---|---|---|---|---|---|---|---|
| Formulation* | | | | | | | | | | | |
| Polyol I | 100 | 90 | 80 | 100 | 100 | 100 | 100 | 100 | 100 | 100 | 100 |
| UCON 11B | 46 | 46 | 46 | 46 | 46 | 46 | 46 | 46 | 46 | 46 | 46 |
| Surfactant I | 3.0 | 3.0 | 3.0 | 3.0 | 3.0 | 3.0 | 3.0 | 3.0 | 3.0 | 3.0 | 3.0 |
| Catalyst D-22 | 0.4 | 0.4 | 0.4 | — | — | — | — | — | — | — | — |
| TMBDA Catalyst | 0.8 | 0.8 | 0.8 | 0.8 | 0.8 | 0.8 | 0.8 | 0.8 | — | — | — |
| $Sb[OCH(CH_3)_2]_3$ | — | — | — | 2.0 | 2.0 | 2.0 | 2.0 | 2.0 | 2.0 | — | — |
| $Sb(OOCC_7H_{15})_3$ | — | — | — | — | — | — | — | — | — | 2.0 | 2.0 |
| Fyrol 6 | — | 10 | 20 | — | — | — | — | — | — | — | — |
| Isocyanate IV | 110.3 | 110.3 | 110.3 | — | — | — | — | — | — | — | — |
| Imido Isocyanate | | | | | | | | | | | |
| do. 1 | — | — | — | 131 | — | — | — | — | — | 131 | — |
| do. 2 | — | — | — | — | 135.6 | — | — | — | — | — | — |
| do. 3 | — | — | — | — | — | 167 | — | — | — | — | — |
| do. 4 | — | — | — | — | — | — | 143 | — | 143 | — | 143 |
| do. 5 | — | — | — | — | — | — | — | 162.4 | — | — | — |
| % Phosphorus | — | 0.57 | 1.15 | — | — | — | — | — | — | — | — |
| % Chlorine | — | — | — | 11.59 | 10.58 | 9.77 | 7.15 | 9.54 | 7.18 | 11.63 | 7.18 |
| Foaming Characteristics | | | | | | | | | | | |
| Cream Time, sec. | 43 | 28 | 23 | 15 | 15 | 15 | 15 | 15 | 15 | 50 | 25 |
| Rise Time sec. | 125 | 85 | 75 | 260 | 150 | 330 | 250 | 305 | 260 | 450 | 325 |
| Tack Free Time, sec. | 116 | 65 | 65 | 195 | 100 | 235 | 155 | 180 | 145 | 370 | 175 |
| Flammability by ASTM D 1692-67T | | | | | | | | | | | |
| Density, pcf | 1.74 | 1.52 | 1.51 | 1.52 | 1.64 | 1.89 | 1.87 | 2.01 | 1.70 | 1.63 | 1.74 |
| Rating | Burning | SE | SE | Burning | SE | SE | Burning | SE | Burning | Burning | Burning |
| Extinguishing Time, sec. | — | 60 | 60 | — | 50 | 46 | — | 39 | — | — | — |
| Burning Extent, in. | — | 0.4 | 0.4 | — | 1.4 | 1.2 | — | 1.4 | — | — | — |
| Burning Rate, in./min. | 5.3 | 0.4 | 0.4 | 3.8 | 1.7 | 1.8 | 4.7 | 5.6 | 5.4 | 6.0 | |
| Flammability by Bureau of Mines Flame Penetration Test | | | | | | | | | | | |
| Density, pcf | 1.53 | 1.44 | 1.43 | 1.60 | 1.60 | 1.96 | 1.70 | 1.89 | 1.71 | 1.48 | 1.74 |
| Penetration Time, sec. | 8.5 | 352.0 | 319.5 | 194.5 | 136.5 | 1315.5 | 70.0 | 2227.0 | 6.5 | 21.0 | 8.0 |
| Weight Loss, % | 10.84 | 19.76 | 20.58 | 21.02 | 20.15 | 28.29 | 9.76 | 28.04 | 9.41 | 17.61 | 11.09 |
| Mechanical Properties | | | | | | | | | | | |
| Cell Structure, Appearance | 122 | 122 | — | 122 | 122 | 122 | 122 | 122 | 122 | 122 | 122 |
| Core Density, pcf | 1.61 | 1.49 | 1.48 | 1.52 | 1.64 | 1.89 | 1.76 | 2.05 | 1.70 | 1.56 | 1.76 |
| Closed Cells, % | 57.4 | 85.8 | 88.5 | 88.9 | 90.6 | 88.4 | 92.2 | 90.7 | 91.0 | 86.1 | 90.1 |
| Compressive Strength, 20°C. ASTM D-1621 parallel, psi. | 17.9 | 19.2 | 24.4 | 17.7 | 21.5 | 24.5 | 24.2 | 18.8 | 22.3 | 20.6 | 26.8 |
| perpendicular, psi. | 7.6 | 7.7 | 7.4 | 8.1 | 8.8 | 9.3 | 13.9 | 10.7 | 10.8 | 8.1 | 1.1 |
| Friability, ASTM C367 and C421 Density, pcf | 1.44 | 1.36 | 1.23 | 1.52 | 1.59 | 1.69 | 1.59 | 1.82 | 1.48 | 1.39 | 1.49 |
| Weight Loss, % | | | | | | | | | | | |
| 2 min. | 1 | 1 | 0 | 9 | 5 | 2 | 0 | 8 | 0 | 15 | 4 |
| 10 min. | 16 | 9 | 9 | 54 | 34 | 22 | 15 | 50 | 10 | 71 | 34 |

* Parts by Weight

The results as shown in Table V-C indicate that antimony catalysts considerably shortened the tack-free time. It should be noted that such catalysts are essential in order to obtain reasonably short tack-free times with imido isocyanates produced from trimellitic anhydride and polymethylene poly(phenyleneisocyanate) whereas acceptable cure times are obtained with the novel imido isocyanates of this invention as shown in Table V-A.

The flammability properties measured by the Bureau of Mines Flame Penetration Test shown in Table V-A, Table V-B and Table V-C illustrates the effectiveness of the imido isocyanates of this invention produced from chlorine-containing anhydrides and polyarylisocyanate (Isocyanates II and IV) to resist flame deterioration studied. The resistance of flame penetration was excellent in all cases and it is probably due to the presence of imide linkages.

EXAMPLE VI

Five imido isocyanates were prepared by reacting trimellitic anhydride (TMA) with various isocyanates in the presence of triphenyl phosphine ($\phi_3P$) and dimethyl sulfoxide (DMSO) using the reaction mixtures shown in Table VI below. In three of the runs (Runs 1, 2 and 5) solid products were produced because the level of isocyanate employed was low. The other two runs (Runs 3 and 4) illustrate the preferred process of this invention which produce liquid products. The imido isocyanates produced in Runs 2, 3 and 4 were dissolved in Isocyanate II in order to achieve a higher NCO value and higher overall NCO functionality in order to produce a rigid foam. The physical state of the products was noted. The initial viscosity and the viscosity after 55 days of the product of Runs 3 and 4 were noted. The Isocyanate II solutions of the imido isocyanates produced in Runs 3 and 4 were further diluted with Ucon 11B in order to achieve a lower and more workable viscosity for blending with the other components of foams. The latter solutions contained 90 weight per cent of the isocyanates and 10 per cent of the Ucon 11B. The viscosities of these "Ucon 11B" solutions initially and after 41 days were measured. The storage stability of the Ucon 11B solutions shown in Table VI below was outstanding.

The Ucon 11B solutions of the imido isocyanates of Runs 3 and 4 (designated Imido Isocyanates Solutions A and B respectively) were converted to polyurethane foams using the formulations indicated in Table VII below and the general procedure described in Example V above. Properties of the foams were measured and are shown in Table VII below. Some shrinkage of the foams was observed but they were satisfactory foams overall.

TABLE VI

| IMIDO ISOCYANATES FROM TRIMELLITIC ANHYDRIDE AND VARIOUS ISOCYANATES | | | | | |
|---|---|---|---|---|---|
| Run | 1 | 2 | 3 | 4 | 5 |
| Reaction Mixture | | | | | |
| Trimellitic Anhydride, g. (mols) | 96 (0.5) | 192 (1.0) | 192 (1.0) | 192 (1.0) | 192 (1.0) |
| Isocyanate I, g. (e.q. NCO) | 348 (4.0) | — | — | — | — |
| do. II, g. (e.q. NCO) | — | 270 (2.0) | 1890 (14) | 1350 (10) | — |
| do. IV, g. (eq. NCO) | — | — | — | — | 1080 (8) |
| $\phi_3 P$, grams | 0.278 | 0.644 | 0.64 | 0.64 | 0.64 |
| DMSO, ml. | 10 | 10 | 10 | 10 | 10 |
| $CO_2$ evolved, ml. | 23,200 | 35,200 | 26,700 | 15,800 | 23,200 |
| Reaction Conditions | | | | | |
| Time, hrs. | 6 | 4 | 7 | 7 | 6 |
| Temperature, °C. | 147 | 137 | 144 | 94 | 128 |
| Final Product | | | | | |
| Isocyanate II Diluent, g (eq. NCO) | — | 270 (2) | 810 (6) | 270 (2) | — |
| Description | Red Tacky Solid | Black Solid | Black Liquid | Black Viscous Liquid | Black Solid |
| viscosity cps. at 25°C. | | | | | |
| Initial | — | — | 120,600 | — | — |
| After 55 days | — | — | 140,800 | — | — |
| UCON 11B Solutions | | | | | |
| Viscosity, cps. at 25°C | | | | | |
| Initial | — | — | 10,540 | 24,100 | — |
| After 41 days | — | — | 16,992 | 45,150 | — |

TABLE VII

| PROPERTIES OF RIGID POLYURETHANE FOAMS | | | |
|---|---|---|---|
| Formulation* | | | |
| Polyol I | | 75 | 75 |
| Imido Isocyanate Solution | A | 263 | — |
| do. | B | — | 263 |
| Surfactant I | | 3.0 | 3.0 |
| UCON 11B | | 35 | 35 |
| Antimony Octoate | | 6.6 | 6.6 |
| Foaming Characteristics | | | |
| Cream Time, sec. | | 20 | 20 |
| Rise Time, sec. | | 145 | 120 |
| Tack-Free Time, sec. | | 95 | 90 |
| Mechanical Properties: | | | |
| Density, pcf (Core) | | 2.37 | 2.24 |
| Closed Cells, % | | 85.4 | 84.3 |
| Compressive Strength, 25°C. ASTM D-1621 | | | |
| Parallel, psi. | | 29.3 | 23.8 |
| Perpendicular, psi. | | 11.1 | 9.4 |
| Flammability by ASTM D-1692-67T | | | |

TABLE VII — Continued

PROPERTIES OF RIGID POLYURETHANE FOAMS

| | | |
|---|---|---|
| Rating | SE | SE |
| Burning Extent, inches | 0.8 | 0.7 |
| Extinguishing Time, sec. | 24 | 25 |
| Flammability by Bureau of Mines Flame Penetration Test | | |
| Density, pcf | 2.21 | 2.10 |
| Penetration Time, sec. | 561 | 579 |
| Weight Loss, % | 23.8 | 23.7 |

*Parts by Weight

What is claimed is:

1. A process for producing an aromatic isocyanate containing an imido group which process comprises: (I) forming a reaction mixture containing (a) an anhydride of organic polycarboxylic acid, (b) an aromatic polyisocyanate, (c) a catalytic amount of $MB(R)_4$, $(R)_3P$, $(R)_4POOCR$, or $MP(F)_6$ wherein M is an alkali metal and R is an alkyl group or an aryl group, and (d) a catalytic amount of a dialkylsulfoxide; and (II) maintaining the mixture at a temperature at which (a) and (b) react in the presence of (c) and (d) to produce an aromatic isocyanate containing an imido group.

2. A process as claimed in claim 1 wherein component (c) is triphenyl phosphine.

3. A process as claimed in claim 1 wherein component (d) is dimethyl sulfoxide.

4. A process as claimed in claim 1 wherein component (c) is triphenyl phosphine and component (d) is dimethyl sulfoxide.

5. A process as claimed in claim 1 wherein component (a) is represented by the formula

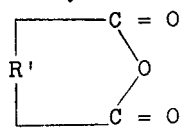

wherein R' is a divalent hydrocarbon group or divalent hydrocarbon group substituted by at least one halogen atom, active hydrogen-containing group or acyl halide (halogen—CO—) group.

6. A process as claimed in claim 5 wherein R' is represented by the formula

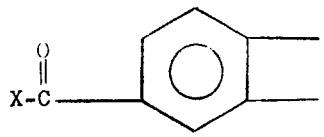

wherein X is HO or halogen.

7. A process as claimed in claim 1 wherein component (b) is represented by the formula:

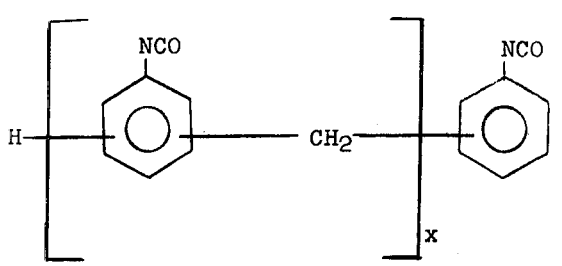

wherein X has an average value from 1.1 to 5 inclusive.

8. A process as claimed in claim 7 wherein x has an average value from 1.0 to 4.0 inclusive.

9. A process as claimed in claim 1 wherein component (a) is chlorendic acid anhydride.

10. A process as claimed in claim 1 wherein component (a) is trimellitic anhydride and component (b) is as defined in claim 7.

11. A process as claimed in claim 1 wherein component (a) is chlorendic acid anhydride and component (b) is tolylene diisocyanate.

12. A process as claimed in claim 1, which process comprises:
(I) forming a reaction mixture containing (a) chlorendic acid anhydride or trimellitic anhydride, (b) an aromatic polyisocyanate represented by the formula:

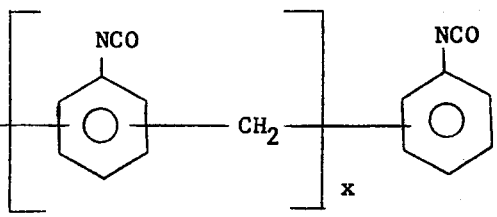

wherein x has an average value from 1.1 to 5 inclusive, (c) a catalytic amount of triphenyl phosphine, tetrabutylphosphonium acetate, sodium tetraphenyl boron or lithium hexafluorophosphate and (d) a catalytic amount of dimethyl sulfoxide; and
(II) maintaining the mixture at a temperature at which (a) and (b) react in the presence of (c) and (d) to produce an aromatic isocyanate containing an imido group.

13. A process for producing an aromatic isocyanate containing an imido group which process comprises:
(I) forming a reaction mixture containing (a) chlorendic acid anhydride or trimellitic anhydride, (b) an aromatic polyisocyanate represented by the formula:

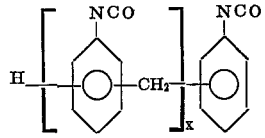

wherein x has an average value from 1.1 to 5 inclusive, (c) a catalytic amount of triphenyl phosphine, tetrabutylphosphonium acetate, sodium tetraphenyl boron or lithium hexafluorophosphate and (d) a catalytic amount of dimethyl sulfoxide; and
(II) maintaining the mixture at a temperature from 25°C to 200°C to cause (a) and (b) to react in the presence of (c) and (d) to produce an aromatic isocyanate containing an imido group, said reaction mixture being formed by first forming an admixture of (a) and (b) and then adding (c) and (d) to the admixture and (a) and (b) being present in said reaction mixture in relative amounts such that there is at least one isocyanato group per polyisocyanate molecule in excess of the of the amount of isocyanato groups required to react with the groups in the anhydride reactive with isocyanato groups.

* * * * *

UNITED STATES PATENT OFFICE
CERTIFICATE OF CORRECTION

Patent No. 3,875,183            Dated April 1, 1975

Inventor(s) Anthony J. Papa et al

It is certified that error appears in the above-identified patent and that said Letters Patent are hereby corrected as shown below:

Column 8, line 9; "afew" should read --a few--. Column 11, line 18; "speciment" should read --specimen--. Column 12, line 5; "have" should read --has--. Column 21 and 22; under "Burning Rate, in/min"; Number 8, "5.6" should read --2.4--; Number 9, "5.4" should read --5.6--; Number 10, "6.0" should read --5.4--; Number 11 should read --6.0--.

Signed and Sealed this

Third Day of August 1976

[SEAL]

Attest:

RUTH C. MASON
*Attesting Officer*

C. MARSHALL DANN
*Commissioner of Patents and Trademarks*